US011550326B2

(12) United States Patent
Ha et al.

(10) Patent No.: US 11,550,326 B2
(45) Date of Patent: Jan. 10, 2023

(54) METHOD AND APPARATUS FOR CONTROLLING VEHICLE (71) Applicant: SAMSUNG ELECTRONICS CO., LTD., Suwon-si (KR)

(72) Inventors: Mi-sook Ha, Hwaseong-si (KR); Cheol-hun Jang, Pohang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 633 days.

(21) Appl. No.: 16/516,614

(22) Filed: Jul. 19, 2019

(65) Prior Publication Data
US 2020/0117205 A1 Apr. 16, 2020

(30) Foreign Application Priority Data

Oct. 15, 2018 (KR) .................. 10-2018-0122251

(51) Int. Cl.
G05D 1/02 (2020.01)
G05D 1/00 (2006.01)
G06N 3/08 (2006.01)
H04L 9/40 (2022.01)
H04W 12/037 (2021.01)

(52) U.S. Cl.
CPC ......... G05D 1/0221 (2013.01); G05D 1/0088 (2013.01); G06N 3/08 (2013.01); H04L 63/0428 (2013.01); H04W 12/037 (2021.01)

(58) Field of Classification Search
CPC ...... G05D 1/0221; G05D 1/0088; G06N 3/08; H04L 63/0428; H04W 12/037; B60W 2556/45

USPC .......................................................... 701/27
See application file for complete search history.

(56) References Cited

U.S. PATENT DOCUMENTS

| 6,957,138 | B2 | 10/2005 | Kondo et al. |
| 9,604,607 | B2 | 3/2017 | Hammoud et al. |
| 10,106,153 | B1 * | 10/2018 | Xiao ...................... G06N 3/084 |
| 2012/0245791 | A1 | 9/2012 | Yun et al. |
| 2017/0334450 | A1 | 11/2017 | Shiraishi et al. |
| 2018/0089563 | A1 * | 3/2018 | Redding .................. G06N 3/08 |
| 2018/0348775 | A1 * | 12/2018 | Yu ....................... B60W 30/188 |
| 2019/0004535 | A1 * | 1/2019 | Huang ..................... G06T 5/50 |
| 2019/0019087 | A1 * | 1/2019 | Fukui ................... G06N 3/0454 |
| 2019/0147254 | A1 * | 5/2019 | Bai ........................ G06V 10/82 |
| | | | 382/104 |
| 2019/0213451 | A1 * | 7/2019 | Schäfer .................. G06V 10/10 |
| 2019/0258878 | A1 * | 8/2019 | Koivisto .............. G06V 20/584 |
| 2019/0266418 | A1 * | 8/2019 | Xu ........................ G06V 10/457 |
| 2019/0332111 | A1 * | 10/2019 | Michalakis ....... B60W 60/0053 |

FOREIGN PATENT DOCUMENTS

| JP | 3622744 B2 | 2/2005 |
| KR | 10-2012-0107774 A | 10/2012 |
| KR | 10-2013-0065823 A | 6/2013 |

(Continued)

OTHER PUBLICATIONS

Communication dated Aug. 26, 2022, issued by the Korean Intellectual Property Office in Korean Patent Application No. 10-2018-0122251.

Primary Examiner — Krishnan Ramesh
(74) Attorney, Agent, or Firm — Sughrue Mion, PLLC (57) ABSTRACT A method of controlling a vehicle using a first model trained according to optimized output of a second model.

20 Claims, 5 Drawing Sheets (56) References Cited

FOREIGN PATENT DOCUMENTS

| KR | 10-2014-0147298 A | 12/2014 |
|---|---|---|
| KR | 10-2016-0144597 A | 12/2016 |
| KR | 10-1710982 B1 | 2/2017 |
| KR | 10-2018-0042728 A | 4/2018 |
| KR | 10-2018-0097247 A | 8/2018 |

* cited by examiner

METHOD AND APPARATUS FOR CONTROLLING VEHICLE

CROSS-REFERENCE TO RELATED APPLICATION

This application claims priority from Korean Patent Application No. 10-2018-0122251, filed on Oct. 15, 2018, in the Korean Intellectual Property Office, the disclosure of which is herein incorporated by reference in its entirety.

BACKGROUND

Embodiments of the application relate to a method and an apparatus for controlling a vehicle.

Various visual information augmentations are provided to assist the steering of vehicles and other transportation devices. To generate the visual information, lane marks or road information may be extracted from arbitrary driving images and processed. When a running state of the vehicle is recognized or the vehicle is controlled by using the road information obtained from the driving images in this manner, a large amount of data may be required for learning, and a large amount of processing time may be required for optimizing the data. In addition, when access to the data is exposed, there may be a commensurate problem of exposure of personal information about when and where a user has moved.

SUMMARY

Embodiments of the application provide a method and an apparatus for controlling a vehicle.

According to an aspect of an embodiment, there is provided a method of controlling a vehicle, the method including: obtaining vehicle control parameters of the vehicle; obtaining an intermediate output value of a first model that receives the vehicle control parameters as input; transmitting, to a server, user driving information comprising the vehicle control parameters and the intermediate output value; receiving, from the server, vehicle control information optimized for controlling the vehicle determined based on the user driving information; training the first model based on the vehicle control information; and controlling the vehicle by using the trained first model.

According to another aspect of an embodiment, there is provided a non-transitory computer-readable recording medium having embodied thereon a program for executing a method of controlling a vehicle.

According to another aspect of an embodiment, there is provided an apparatus configured to control a vehicle, the apparatus including: sensors configured to obtain vehicle control parameters of the vehicle; a processor configured to obtain an intermediate output value of a first model that receives the vehicle control parameters as input; a communication interface configured to transmit, to a server, user driving information comprising the vehicle control parameters and the intermediate output value, and receive from the server vehicle control information optimized for controlling the vehicle determined based on the user driving information, wherein the processor is further configured to train the first model based on the vehicle control information and control the vehicle by using the trained first model.

BRIEF DESCRIPTION OF THE DRAWINGS

Embodiments of the application will be more clearly understood from the following detailed description taken in conjunction with the accompanying drawings in which.

DETAILED DESCRIPTION OF THE EMBODIMENTS

Hereinafter, embodiments of the application will be described in detail with reference to the accompanying drawings.

Figure 1:
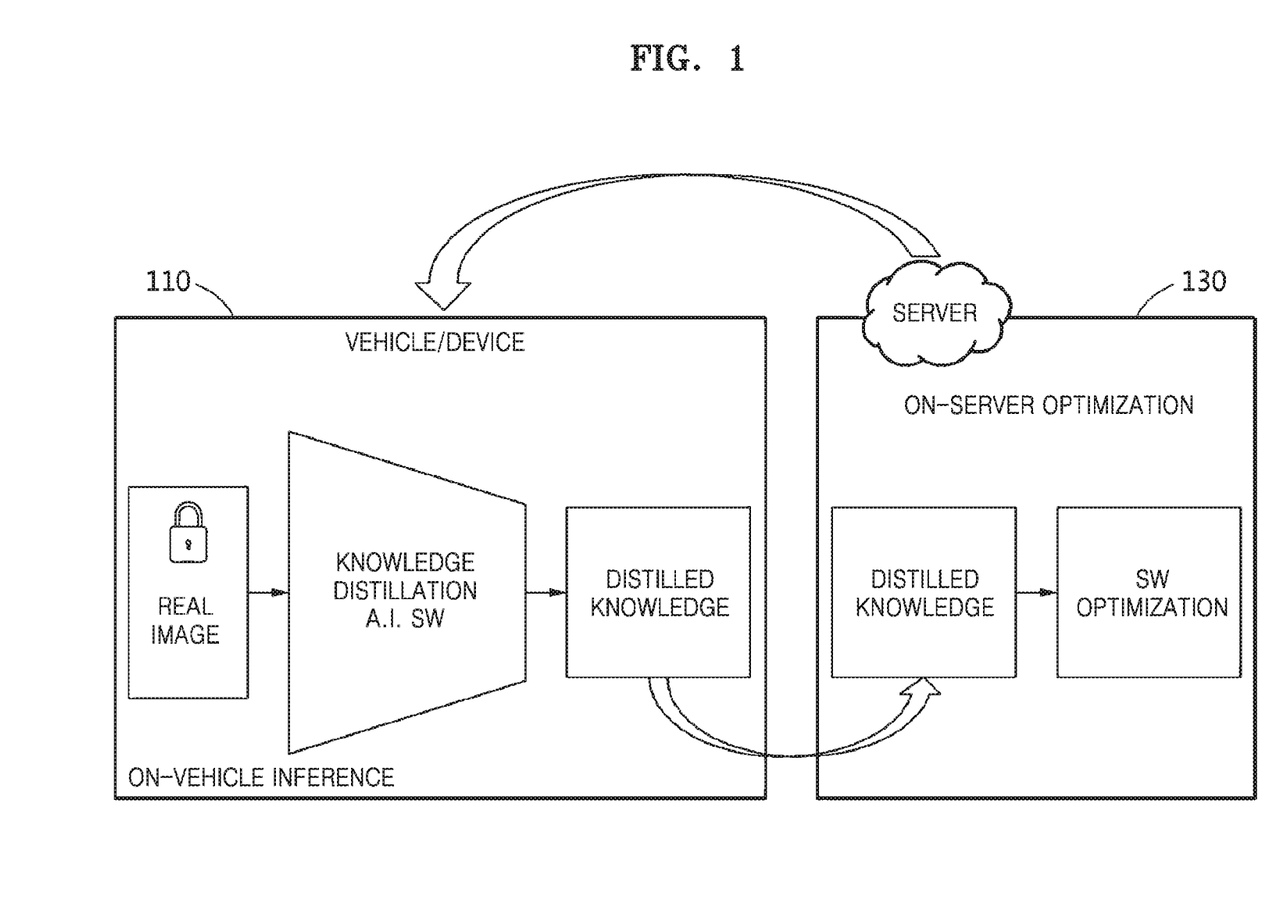
FIG. 1 is a diagram for explaining a method of controlling a vehicle, according to an embodiment.

FIG. 1 is a diagram for explaining a method of controlling a vehicle, according to an embodiment.

Referring to FIG. 1, an operation between a device 110 controlling the vehicle (hereinafter, referred to as a control device) and a server 130 is illustrated. The control device 110 may be the vehicle itself, and the control device 110 may be a component or system embedded or contained in the vehicle. The control device 110 may be coupled to the vehicle via an interface, for example a USB interface, a wired connection, a wireless connection such as Bluetooth or WiFi, etc., as a user terminal such as a smart phone. The vehicle may be any transportation vehicle for traveling on a road or other surface, and may include, for example, an autonomous vehicle, an intelligent vehicle equipped with an advanced driver assistance system (ADAS), etc.

The control device 110 may obtain information of a driving environment of a vehicle. The information of the driving environment may correspond to information or driving parameters for how a user (driver) behaves (operates) in a certain driving environment. For example, the information for the driving environment may include vehicle driving images and vehicle control parameters corresponding to a time point at which the vehicle driving images are obtained. Here, the vehicle driving images may be obtained by a photographing apparatus mounted on the vehicle at the time of driving the vehicle and/or at the time of stopping the vehicle. The photographing apparatus may be configured to photograph a font view, a side view, or etc. of the vehicle. Alternatively, the vehicle driving images may be an external image, of at least one of a front side and both sides of the vehicle, received from a source external to the control device 110 via a communication interface (refer to a communication interface 540 in FIG. 5). The vehicle driving images may include, for example, a road image including a vehicle in the neighborhood, a lane, a curb, a sidewalk, and a surrounding environment, and/or a road surface image. The vehicle driving images may include various images such as an infrared image, a depth image, and a stereo image, in addition to a color image. The vehicle driving images may include one frame or a plurality of frames, or a video sequence of frames. The driving image may include a two-dimensional (2D) driving image and a three-dimensional (3D) driving image.

In addition, the 'vehicle control parameters' may include parameters related to steering and/or driving control components of the vehicle, such as acceleration rate of an accelerator, a braking rate of a brake, and steering angles and/or changes of a steering wheel.

As described above, the information for the driving environment may include personal information such as when, where, and in what driving pattern the user of the vehicle has driven. Accordingly, in an embodiment, the personal information may be protected by prohibiting external transmission of the information for the driving environment, in other words, raw data of the vehicle driving images and vehicle control parameters. The raw data may be data related to, for example, the vehicle driving images, a radar signal, a light detection and ranging (LiDAR) signal, a speed of the vehicle, a braking operation, an acceleration operation of the accelerator, an steering operation of the steering wheel, etc.

The control device 110 may process the vehicle driving image and/or the vehicle control parameters into information (or distilled knowledge), and transmit the processed control parameters to the server 130. At this time, the information may include, for example, driving characteristics (for example, characteristic vector or characteristic map) of the user that is extracted based on the information for the driving environment, and a soft level corresponding to information (or probability information) about, for example, where an object exists in an original data (or driving image). The median values calculated in processing the information for the driving environment in the control device 110 may have a form of, for example, an unknown vector. In an embodiment, user personal information may be protected without a separate encryption process by transmitting the median values calculated in the processing of the original data as the digital information. According to an embodiment, the control device 110 may separately encrypt the information for the driving environment (for example, the vehicle control parameters) and transmit the encrypted information to the server 130.

The server 130 may execute software that recognizes vehicle control operation by using the digital information. Here, the software may predict, for example, how the user will (or drive or behave) based on user driving information (or user digital information). The server 130 may determine or calculate the vehicle control information that is quickly and efficiently optimized, with respect to processing the original data, by optimizing the digital information. The server 130 may transmit to the control device 110 the optimized vehicle control information including, for example, parameter values of the model optimized for the driving pattern of the user.

The control device 110 may control the vehicle to be optimized for the user by using the optimized vehicle control information received from the server 130.

Figure 2:
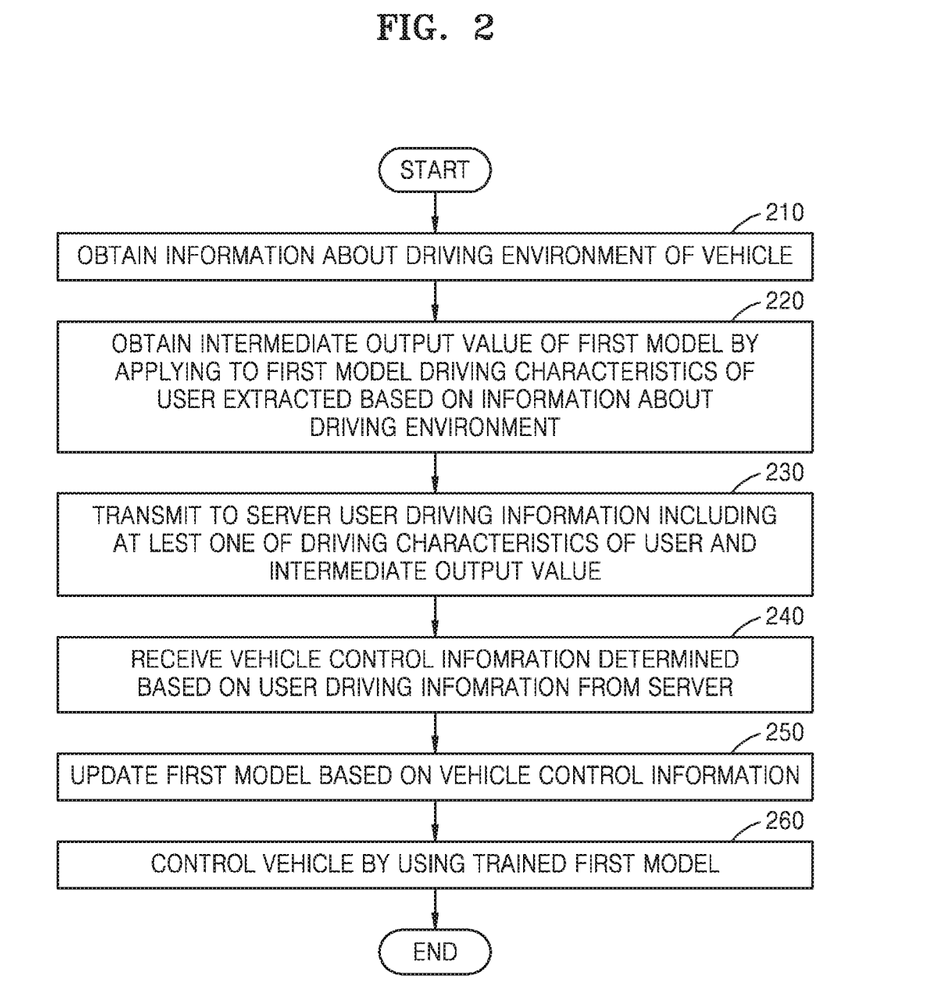
FIG. 2 is a flowchart of a method of controlling a vehicle, according to an embodiment.

FIG. 2 is a flowchart of a method of controlling a vehicle, according to an embodiment.

Referring to FIG. 2, a control device according to an embodiment may obtain the information for the driving environment of the vehicle (S210). The control device may obtain the information for the driving environment by using at least one of, for example, an image sensor, a radar, a LiDAR, a gyro sensor, an acceleration sensor, and a global positioning system (GPS) sensor.

The control device may obtain an intermediate output value of a first model by applying the driving characteristics of the user extracted based on the information for the driving environment as input to the first model (S220). The control device may extract the driving characteristics of the user in the driving environment based on the information for the driving environment. The driving characteristics may be extracted by, for example, layers included in the first model, or a separate neural network or a separate characteristics extraction function. The driving characteristics may be, for example, in the form of a characteristics vector or a characteristics map.

The first model may include a neural network including a plurality of layers such as an input layer, a hidden layer, and an output layer. Here, the first model may be, for example, a running model of the vehicle that recognizes a driving situation of the vehicle based on the driving characteristics and controls the vehicle. The neural network may include, for example, a convolution neural network (CNN), a deep neural network (DNN), and a recurrent neural network (RNN).

The control device may obtain an output value of an intermediate layer among the plurality of layers of the first model. The intermediate layer may include, for example, a hidden layer.

The control device may transmit to the server 130 the user driving information including at least one of the driving characteristics of the user and the intermediate output value (S230). The control device may separately transmit the driving characteristics of the user and the intermediate output value, or may transmit both the driving characteristics of the user and the intermediate output value together.

The control device may receive from the server the vehicle control information that is determined based on the user driving information (S240). Here, the server may include, for example, a second model based on the neural network. The second model may include, for example, a driving learning model for outputting the vehicle control information optimized for the driving pattern of the user. The optimized vehicle control information may include, for example, parameter values of the first model. The second model may be trained by, for example, a zero-shot learning method. The 'zero-shot learning' may be a method of learning such that an intersection between a class of learning data and a class of correct data becomes an empty set. In other words, the zero-shot learning may be a method of learning to hit a class that is not included in the learning data. According to the zero-shot learning method, a class that is not included in the learning data may be predicted based on a semantic relationship between labels of the class.

The control device may update the first model based on the vehicle control information (S250). Based on the vehicle control information, the control device may update layers after the intermediate layer of the first model. For example, in operation S220, the output value is obtained from a third layer among the layers of the first model layer. In this case, the control device may update, based on the vehicle control information, layers after the third layer of the first model, for example, from a fourth layer to the output layer (S250).

The control device may control the vehicle by using the updated first model (S260). The control device may control the vehicle by using the control parameters (that are optimized) output from the updated first model.

Figure 3:
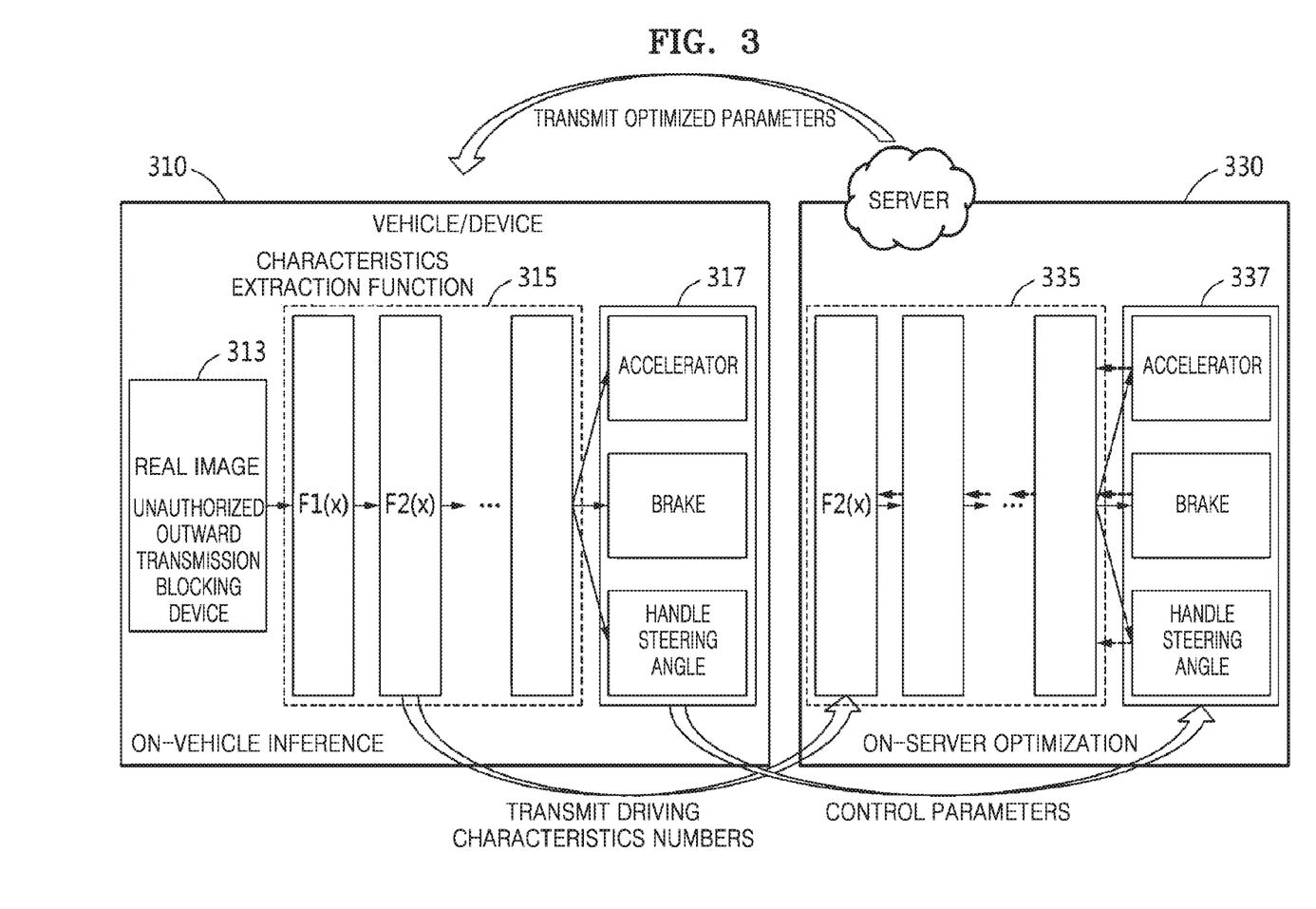
FIG. 3 is a diagram for explaining a method of controlling a vehicle, according to an embodiment.

FIG. 3 is a diagram for explaining a method of controlling a vehicle, according to an embodiment.

Referring to FIG. 3, structures of the control device 310 and the server 330 for controlling the vehicle according to an embodiment are illustrated.

The control device 310 may include an unauthorized outward transmission blocking device 313 and a first model 315 that is based on a neural network.

The unauthorized outward transmission blocking device 313 may be a device that blocks an unauthorized outward transmission of the information for the driving environment, that is, the raw data of the driving images and the vehicle control parameters. The unauthorized outward transmission blocking device 313 may block the unauthorized outward transmission of the raw data of the information for the driving environment, except when authorization of the user is obtained.

The first model 315 may include a first neural network that extracts the driving characteristics of the user (for example, the characteristic vector or the characteristic map) based on the information for the driving environment, and a second neural network that recognizes the driving situation of the vehicle based on the driving characteristics of the user and controls the vehicle. The first neural network may be implemented by a function of extracting the driving characteristics of the user based on the information for the driving environment. The first neural network and the second neural network may be embodied as a single neural network of the first model 315, or separate neural networks.

For example, the control device 310 may obtain an intermediate output value $F2(x)$ of the first model 315 from the second layer of the first model 315. The control device 310 may transmit the intermediate output value $F2(x)$ of the first model 315 to the server 330. In addition, the control device 310 may transmit vehicle control parameters 317 output through the first model 315 to the server 330. The vehicle control parameters 317 may be encrypted (or converted) in the form of binary signals and may be transmitted to the server 330.

A second model 335 of the server 330 may receive the intermediate output value $F2(x)$ as an input and output the vehicle control information optimized for the driving pattern of the user. At this time, the second model 335 may also receive the vehicle control parameters 317 transmitted from the control device 310. The second model 335 may output the vehicle control information optimized after reflecting the vehicle control parameters 317 in addition to the intermediate output value $F2(x)$. At this time, the optimized vehicle control information may include the control parameters 337 optimized in the second model 335 based on the intermediate output value $F2(x)$. Optimized control parameters 337 may be provided as a parameter value (optimized) for the first model 315 and to update the first model 315.

Figure 4:
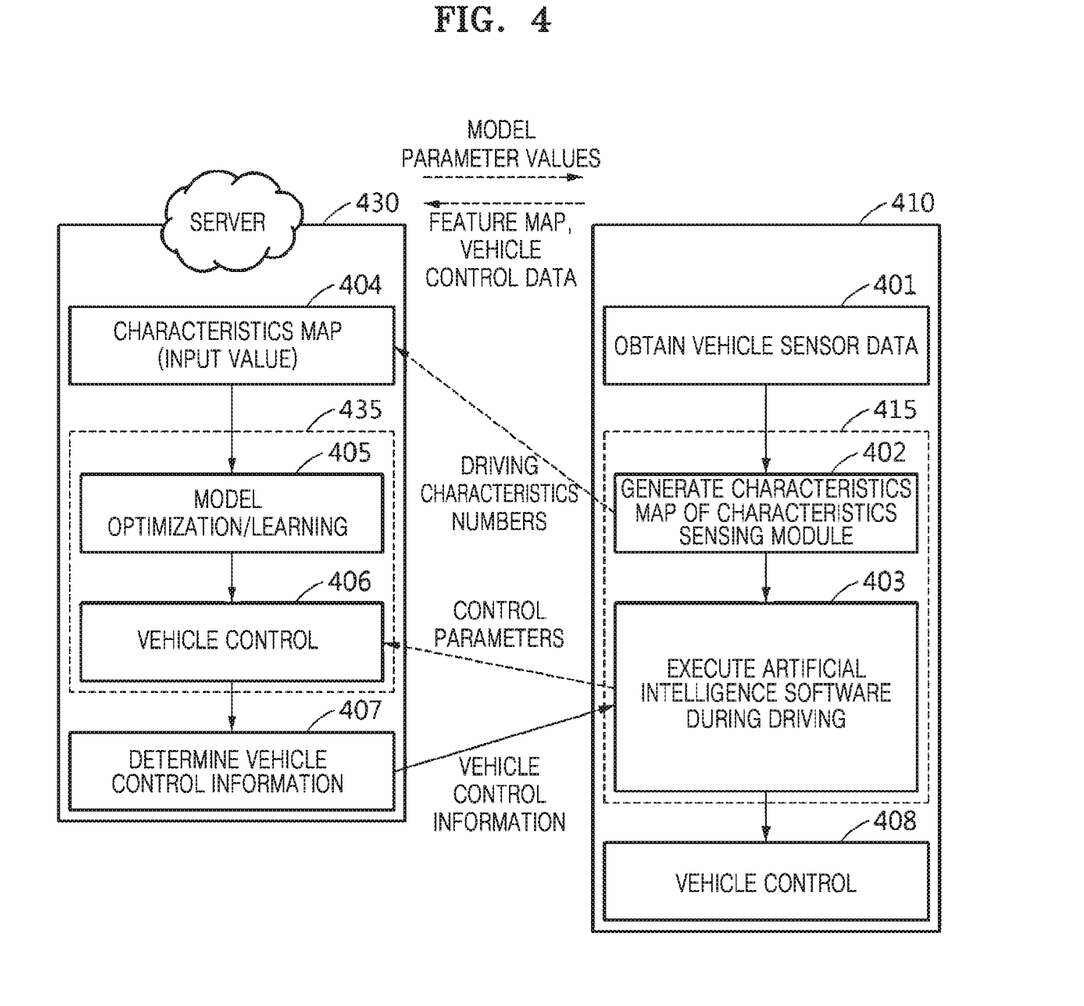
FIG. 4 is an operation flowchart of a method of controlling a vehicle, according to an embodiment.

FIG. 4 is an operation flowchart of a method of controlling a vehicle, according to an embodiment.

Referring to FIG. 4, operations performed between a control device 410 and a server 430 for controlling the vehicle are illustrated. The control device 410 may include a first model 415. The server 430 may include a second model 435.

The control device 410 may obtain vehicle sensor data (S401). At this time, the vehicle sensor data may include the information for the driving environment and may be obtained from, for example, an image sensor, a radar, a LiDAR, a gyro sensor, an acceleration sensor, and a GPS sensor.

The control device 410 may generate a characteristic map corresponding to the driving characteristics of the user from the sensor data by, for example, a characteristics detection module (S402). The characteristics detection module may include a separate neural network or extraction function that extracts characteristics from the sensor data. The control device 410 may transmit to the server 430 the driving characteristics of the user included in the characteristics map in the form of driving characteristics numbers or values. At this time, the server 430 may store the driving characteristics of the user received from the control device 410 (S404).

The control device 410 may apply the driving characteristic of the user (or user characteristics map) generated in operation S402 to the first model 415, recognize the driving situation during the driving of the vehicle, and determine the vehicle control parameters 317 (403). At this time, the control device 410 may obtain the intermediate output value of the first model 415. The control device 410 may transmit to the server 430 the user driving information including the intermediate output value of the first model 415 (S403). In addition, the control device 410 may transmit the control parameters output from the first model 415 to the server 430.

The second model 435 of the server 430 may be trained to optimize the second model 435 based on the driving characteristics of the user stored in operation 404 (S405). In addition, the server 430 may apply the user driving information and/or the control parameters received from the control device 410 to the second model 435 and determine the optimized vehicle control information based on a result of learning vehicle control (S406) to optimize for the driving pattern of the user (S407). According to an embodiment, the server 403 may use a value corresponding to data of the GPS sensor among the driving characteristics numbers transmitted by the control device 410 and train the second model 435 such that the vehicle control information is determined for each position (for example, a country) where the information for the corresponding driving environment has been obtained.

The server 430 may transmit the optimized vehicle control information to the first model 415 of the control device 410. The control device 410 may update the first model 415 by further applying the optimized vehicle control information transmitted by the server 430 to the driving situation and the control parameters recognized during the driving in operation S403.

The control device may control the vehicle by using the updated first model (S408).

Figure 5:
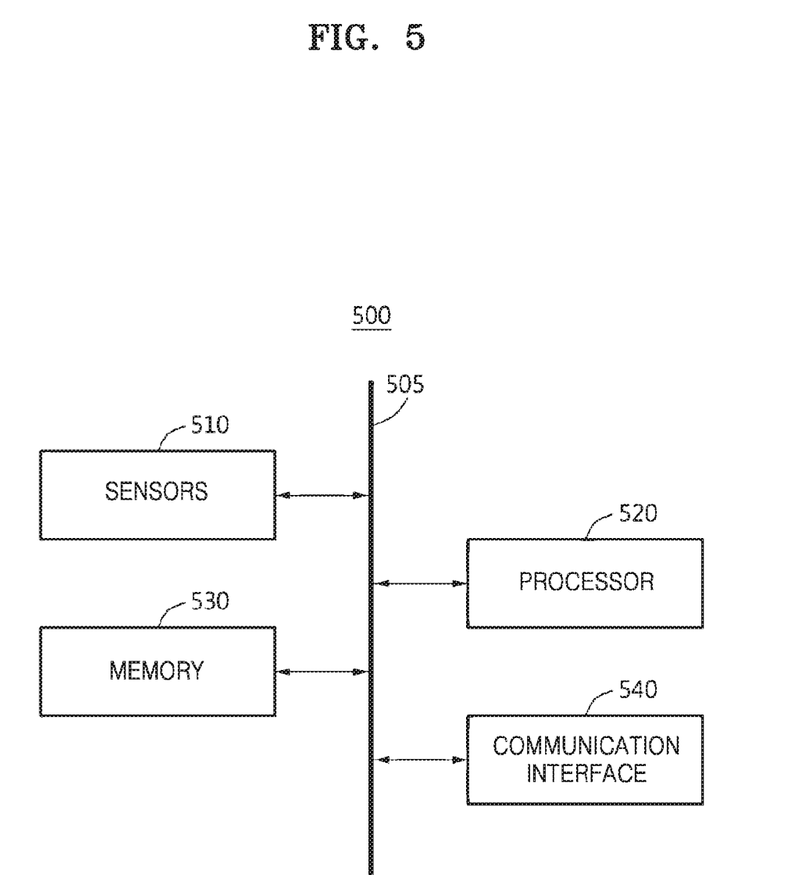
FIG. 5 is a block diagram of an apparatus for controlling a vehicle, according to an embodiment.

FIG. 5 is a block diagram of an apparatus 500 for controlling a vehicle, according to an embodiment.

Referring to FIG. 5, the apparatus (or a 'control device') 500 for controlling the vehicle according to an embodiment may include sensors 510, a processor 520, a memory 530, and a communication interface 540. The sensors 510, the processor 520, the memory 530, and the communication interface 540 may be interconnected with each other via one or more communication bus 505.

The sensors 510 may obtain (or sense) the information for the driving environment. The sensors 510 may include, for example, an image sensor, a radar, a LiDAR, a gyro sensor, an acceleration sensor, a GPS sensor, etc. The image sensor may obtain the vehicle driving images. The radar and/or the LiDAR may obtain speed, distance, position, etc. of the vehicle corresponding to the driving image in addition to the vehicle driving images. The gyro sensor and the acceleration sensor may sense the speed, posture, etc. of the vehicle corresponding to the vehicle driving images at a corresponding time point. The GPS sensor may sense a vehicle position (for example, global coordinates) corresponding to the vehicle driving images.

The processor 520 may extract the driving characteristics of the user in the driving environment based on the information for the driving environment obtained by the sensors 510. The processor 520 may encrypt the information for the driving environment. The communication interface 540 may transmit the driving environment information encrypted by the processor 520 to a server.

The processor 520 may obtain an intermediate output value of a first model by inputting the driving characteristics of the user to the first model, the driving characteristics being extracted based on the information for the driving environment. The first model may include a neural network including a plurality of layers. The first model may be a driving model of the vehicle. The neural network of the first model may recognize the driving situation of the vehicle based on the driving characteristics and control the vehicle. The processor 520 may obtain an output value of an intermediate layer among the plurality of layers of the first model.

The memory 530 may store the information for the driving environment obtained by the sensors 510. The memory 530 may store the driving characteristics of the user extracted from the information for the driving environment by the processor 520, and the intermediate output value of the first model.

The communication interface 540 may transmit to the server 130 the user driving information including at least one of the driving characteristics of the user and the intermediate output value. Here, the server 130 may include a second model based on the neural network. The second model may be, for example, a driving learning model. The second model may receive the user driving information and output the vehicle control information optimized for the driving pattern of the user. The optimized vehicle control information may include parameter values of the first model. The second model may be learned by, for example, the zero-shot learning method.

The communication interface 540 may receive from the server the vehicle control information determined based on the user driving information.

The processor 520 may update the first model based on the vehicle control information received via the communication interface 540. Based on the vehicle control information, the processor 520 may update layers after the intermediate layer of the first model. The processor 520 may control the vehicle by using the updated first model.

In addition, the processor 520 may perform at least one method or control operations described above with reference to FIGS. 1 through 4, or an algorithm corresponding to the at least one method. The processor 520 may be a data processing device, such as a central processing unit or microprocessor, implemented by hardware that includes circuitry having a physical structure for performing required operations. For example, the required operations may include code or instructions included in a program stored in memory and read from memory for execution. For example, the data processing device implemented by hardware may include a microprocessor, a central processing unit, a processor core, a multi-core processor, a multi-processor, an application-specific integrated circuit (ASIC), and a field programmable gate array (FPGA).

The processor 520 may execute the program and control a control device. The code in the program executed by the processor 520 may be stored in the memory 530.

The memory 530 may store various information generated in a process of the processor 520 described above. In addition, the memory 530 may store various data, programs, etc. The memory 530 may include a volatile memory or nonvolatile memory. The memory 530 may store various data by using a mass storage medium such as a hard disk.

The method according to an embodiment may be recorded in a computer-readable recording medium implemented in the form of a program command executable through various computer tools. The computer-readable recording medium may include program instructions, data files, data structures, etc., separately or in a combination thereof. The program instructions to be recorded on the computer-readable recording medium may be those particularly designed and configured for the embodiments or may be available to those with ordinary skills in the art of computer software. Examples of the computer-readable recording medium include magnetic media such as a hard disk, a floppy disk and a magnetic tape, optical media such as CD-ROM and DVD, optical disks such as a floppy disk, and hardware devices specifically configured to store and perform program instructions such as ROM, RAM, flash memory, and the like. Examples of program instructions include machine language code such as those generated by a compiler, as well as high-level language code that is executed by a computer using an interpreter or the like. The hardware devices described above may be configured to operate as one or more software modules for performing the operations of the embodiments, and vice versa.

Although the embodiments have been described with reference to the drawings, those with ordinary skill in the art may apply various technical modifications and variations based on descriptions above. For example, it is to be understood that the techniques described may be performed in a different order than the described methods, and/or components of the described systems, structures, devices, circuits, etc., or equivalents, even though they are replaced or substituted.

Thus, other implementations, other embodiments, and equivalents to the claims are also within the scope of the following claims.

What is claimed is:

1. A method of controlling a vehicle, the method comprising:
    obtaining, by a device using sensors, vehicle control parameters of the vehicle, wherein the device is a part of the vehicle or in close proximity to the vehicle;
    obtaining, by the device, an image of a driving environment;
    determining driving characteristics of a user of the vehicle, wherein the determining comprises extracting, by a first model representing a deep neural network (DNN), the driving characteristics based on information for the driving environment, the information for the driving environment includes the image and the vehicle control parameters;
    determining, by the device, an intermediate output value of the first model that receives the vehicle control parameters as input;
    determining, by the device using the first model performing on-vehicle inference, distilled knowledge including probability information about where an object exists in the image;
    transmitting, to a server from the device, user driving information comprising the vehicle control parameters, the intermediate output value, and the probability information;
    receiving, at the device and from the server, vehicle control information optimized by a second model in the server for controlling the vehicle determined based on the user driving information;
    training, by the device, the first model based on the vehicle control information; and
    controlling, by the device, the vehicle by using the trained first model.

2. The method of claim 1, wherein the DNN includes a plurality of layers, and the first model is configured to recognize a driving situation of the vehicle based on the vehicle control parameters.

3. The method of claim 1, wherein the obtaining comprises obtaining the intermediate output value from among a plurality of layers of the first model.

4. The method of claim 1, wherein the second model is based on a second neural network, and
wherein the second model is configured to output the vehicle control information.

5. The method of claim 4, wherein the second model is trained by a zero-shot learning method.

6. The method of claim 4, wherein the vehicle control information comprises a parameter value input to the first model.

7. The method of claim 1, wherein the training comprises updating at least one layer of the first model based on the vehicle control information.

8. The method of claim 1, wherein the transmitting comprises:
encrypting the vehicle control parameters and the intermediate output value; and
transmitting, to the server, the encrypted vehicle control parameters and the intermediate output value.

9. The method of claim 1, wherein the obtaining the vehicle control parameters comprises extracting the vehicle control parameters based on second information of the driving environment of the vehicle.

10. The method of claim 1, wherein the obtaining the vehicle control parameters comprises obtaining the vehicle control parameters by using at least one of an image sensor, a radar, a LiDAR, a gyro sensor, an accelerometer sensor, and a global positioning system (GPS).

11. A non-transitory computer-readable recording medium having embodied thereon a program for executing the method of claim 1.

12. An apparatus for controlling a vehicle, wherein the apparatus is a part of the vehicle or in close proximity to the vehicle, the apparatus comprising:
sensors configured to:
obtain vehicle control parameters of the vehicle, and;
obtain an image of a driving environment;
a processor configured to:
determine driving characteristics of a user of the vehicle, wherein the determining comprises extracting, by a first model representing a deep neural network (DNN), the driving characteristics based on information for the driving environment, the information for the driving environment includes the image and the vehicle control parameters, and
determine, using the first model performing on-vehicle inference, distilled knowledge including probability information about where an object exists in the image;
determine an intermediate output value of the first model that receives the vehicle control parameters as input; and
a communication interface configured to transmit, to a server, user driving information comprising the vehicle control parameters, the intermediate output value, and the probability information, and receive, from the server, vehicle control information optimized by a second model in the server for controlling the vehicle determined based on the user driving information,
wherein the processor is further configured to train the first model based on the vehicle control information and control the vehicle by using the trained first model.

13. The apparatus of claim 12, wherein the DNN includes a plurality of layers, and the processor is configured to recognize a driving situation of the vehicle based on the vehicle control parameters.

14. The apparatus of claim 12, wherein the processor is further configured to obtain the intermediate output value from among a plurality of layers of the first model.

15. The apparatus of claim 12, wherein the second model is based on a second neural network, and
wherein the second model is configured to output the vehicle control information optimized for controlling the vehicle determined based on the user driving information.

16. The apparatus of claim 15, wherein the second model is trained by using a zero-shot learning method.

17. The apparatus of claim 15, wherein the vehicle control information comprises a parameter value input to the first model.

18. The apparatus of claim 12, wherein the processor is further configured to update at least one layer of the first model based on the vehicle control information.

19. The apparatus of claim 12, wherein the processor is further configured to encrypt the vehicle control parameters and the intermediate output value, and
wherein the communication interface is further configured to transmit the encrypted the vehicle control parameters and the intermediate output value to the server.

20. The apparatus of claim 12, wherein the processor is further configured to extract the vehicle control parameters based on information of a driving environment of the vehicle.

* * * * *